(12) United States Patent
Lee

(10) Patent No.: US 7,843,504 B2
(45) Date of Patent: Nov. 30, 2010

(54) CAMERA CAP WITH A WHITE BALANCE INSERT

(76) Inventor: Chung-Ho Jim Lee, 1521 Greenfield Ave., #302, Los Angeles, CA (US) 90025

( * ) Notice: Subject to any disclaimer, the term of this patent is extended or adjusted under 35 U.S.C. 154(b) by 348 days.

(21) Appl. No.: 11/862,890

(22) Filed: Sep. 27, 2007

(65) Prior Publication Data

US 2009/0086101 A1    Apr. 2, 2009

(51) Int. Cl.
*H04N 5/225* (2006.01)
(52) U.S. Cl. ...................................................... 348/360
(58) Field of Classification Search .................. 348/360; 359/511
See application file for complete search history.

(56) References Cited

U.S. PATENT DOCUMENTS

| | | | | |
|---|---|---|---|---|
| 5,162,942 A | * | 11/1992 | Anzai et al. | 359/511 |
| 5,223,880 A | * | 6/1993 | Rapp | 396/544 |
| 5,242,049 A | * | 9/1993 | Mizuno et al. | 206/308.3 |
| 6,608,648 B1 | * | 8/2003 | Bean | 348/211.7 |
| 6,961,086 B1 | * | 11/2005 | Ichikawa | 348/223.1 |
| 7,717,630 B1 | * | 5/2010 | Wan | 396/448 |
| 2004/0119872 A1 | * | 6/2004 | Ichikawa et al. | 348/360 |
| 2004/0125215 A1 | * | 7/2004 | Wallace | 348/223.1 |
| 2008/0165318 A1 | * | 7/2008 | Oskarsson | 351/71 |
| 2010/0201841 A1 | * | 8/2010 | Wallace | 348/223.1 |

FOREIGN PATENT DOCUMENTS

| | | | | |
|---|---|---|---|---|
| JP | 57069986 A | * | 4/1982 | |
| JP | 04005638 A | * | 1/1992 | |
| TW | 352036 U | * | 3/2009 | |

* cited by examiner

*Primary Examiner*—Jason Chan
*Assistant Examiner*—Cynthia Calderon

(57) ABSTRACT

A dual-purpose camera cap functions as a camera lens protector and a white balance filter. The camera cap includes a camera cap body having a locking mechanism or a flexible member to engage with or fitted over a camera lens housing. The camera cap body also includes a ring-shaped area to be placed in front of a camera lens to partially cover the camera lens. The ring-shaped area defines a center cut-out region. A translucent piece is fitted into the center cut-out area of the camera cap body to protect the camera lens and provide the white balance filtering function.

20 Claims, 3 Drawing Sheets

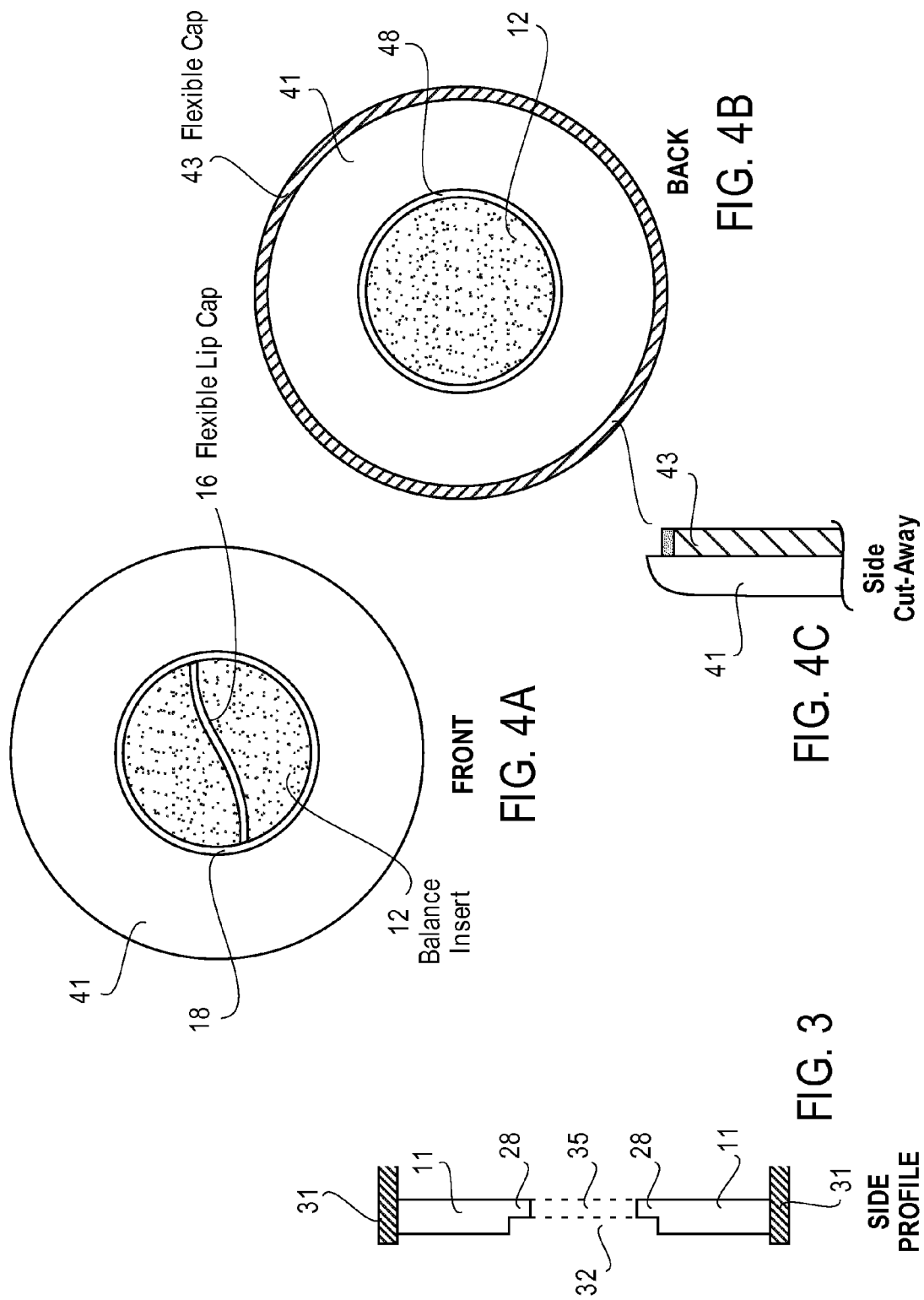

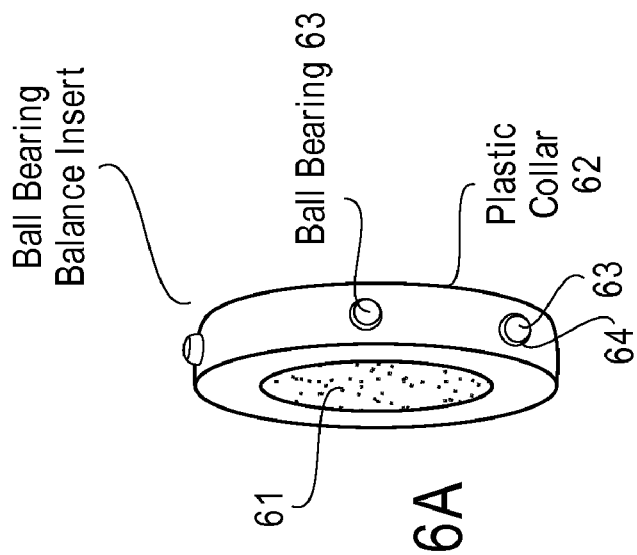
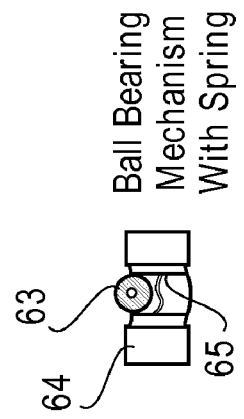
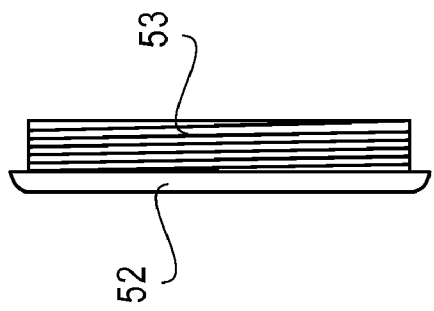
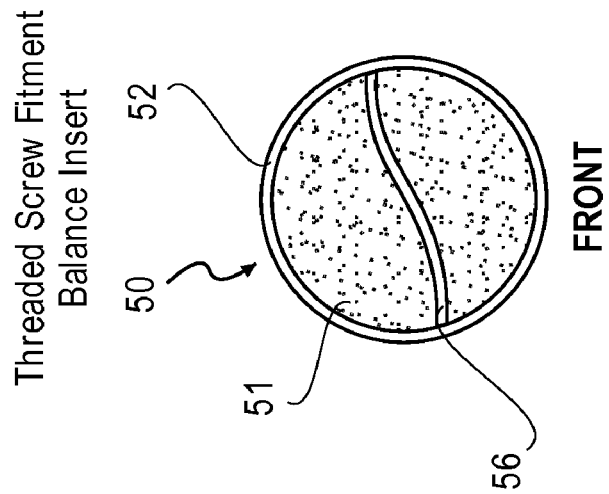

CAMERA CAP WITH A WHITE BALANCE INSERT

TECHNICAL FIELD

Embodiments of the present invention relate to camera accessories, and more specifically, to a camera cap having a white balancing insert.

BACKGROUND

White balance refers to the capture of the color temperature reflected from a photographic subject and the adjustment of camera settings based on the captured color temperature. The camera settings are adjusted such that the colors in the final print substantially match those in reality.

Most digital cameras have an automatic white balance function. However, automatic white balance readings may sometimes fail to correctly distinguish various types, amount and directions of light falling on a scene.

One solution to the problem is to base the white balance setting on a custom setting, typically a scene exposed at 18% gray. This can be done by capturing a reference photo, which typically includes a neutral scene (e.g., a card printed at 18% gray) or a neutral-toned scene (e.g., sidewalk). The reference photo is saved in the camera and used to set the custom white balance in the camera. The reference photo may be taken using a white balance filter lens. However, conventional white balance filter lenses are typically designed to allow easy placement and removal, and are not designed to securely lock to the camera as camera lens protection devices. As a result, conventional white balance filters typically are insecurely placed onto the camera lens and often have the problem of falling off easily. For example, some conventional white balance filter lenses (e.g., ExpoDisc, a product of ExpoImaging, Inc. of Morgan Hill, Calif.) uses ball bearings to attach to the inner rim of the lens housing. The ball bearing design allows the ExpoDisk to be easily put on and taken off. However, a standard inner rim of the lens housing for lens filter attachment is a screw (or thread) type machining. Ball bearing locks cannot accurately line up consistently with the threads as the threads are slanted by nature.

Therefore, a conventional white balance filter lens is generally not an effective lens protection device. Any contact with the inside of a camera bag will likely separate the filter lens from the front of the camera lens, and may even cause damage to the front element of the camera lens, the camera lens body, or the camera itself. Thus, it is generally necessary for a photographer to carry a white balance filter lens as an additional device in the camera bag, and to perform the steps of removing the camera cap and placing the white balance filter lens before taking a reference photo.

BRIEF DESCRIPTION OF THE DRAWINGS

The present invention is illustrated by way of example, and not by way of limitation, in the figures of the accompanying drawings and in which:

FIG. 3 illustrates a side profile of the camera cap of FIGS. 1 and 2.

FIG. 4A illustrates a front view of a camera cap having a flexible member at an outer perimeter and a white balance insert according to an embodiment of the invention.

FIG. 4B illustrates a back view of the camera cap of FIG. 4A.

FIG. 4C illustrates a side cut-away of the camera cap of FIGS. 4A and 4B.

FIG. 5A illustrates a front view of a threaded-screw type white balance insert according to an embodiment of the invention.

FIG. 5B illustrates a side view of the white balance insert of FIG. 5A.

FIG. 6A illustrates a ball bearing type white balance insert according to an embodiment of the invention.

FIG. 6B illustrates a cross section view of a ball bearing element of FIG. 6A.

DETAILED DESCRIPTION

Described herein is a camera cap assembly that functions as a white balance filter and a camera lens protection device. The camera cap assembly has a translucent fitment for custom white balance and a locking mechanism to securely lock the cap assembly onto a camera lens housing. The translucent fitment (also referred to as a translucent piece or a white balance insert) has a predetermined transparency and color tone (e.g., 18% gray), thus allowing a user to select a custom setting for in-camera white balance. The translucent piece is designed to be sufficiently large for the purpose of receiving incident light, but leaves adequate surrounding area on the cap body to accommodate a locking mechanism that securely locks the camera cap assembly onto the camera. Thus, the camera cap assembly can function in lieu of a conventional lens protection cap.

The camera cap assembly described herein can be easily attached to and removed from a camera lens housing, and, at the same time, effectively serves as a white balance filter and a camera lens protection device. The dual feature of the camera cap is realized by providing a ring-shaped area on the cap body surrounding the white balance inset and by placing a secure locking mechanism at least partially in the ring-shaped area. The secure locking mechanism can be easily locked and unlocked. The diameter of the white balance insert is reduced to the extent necessary for the placement of the locking mechanism without a noticeable effect on the accuracy of the custom white balance function.

In some embodiments, the white balance insert may be manually removable from the camera cap body and interchangeable with other inserts. These interchangeable inserts have substantially the same dimension, but may have different color tones, different degrees of translucency, different textures, etc. The white balance insert is locked onto the camera cap body by an interlocking mechanism that securely locks the insert in place and allows easy insertion and removal of the insert. Examples of the interlocking mechanisms include threaded screws, ball bearings, magnets, or other suitable mechanisms. Alternatively, the white balance insert may be immovably attached to the camera cap body in some embodiments.

Figure 1:
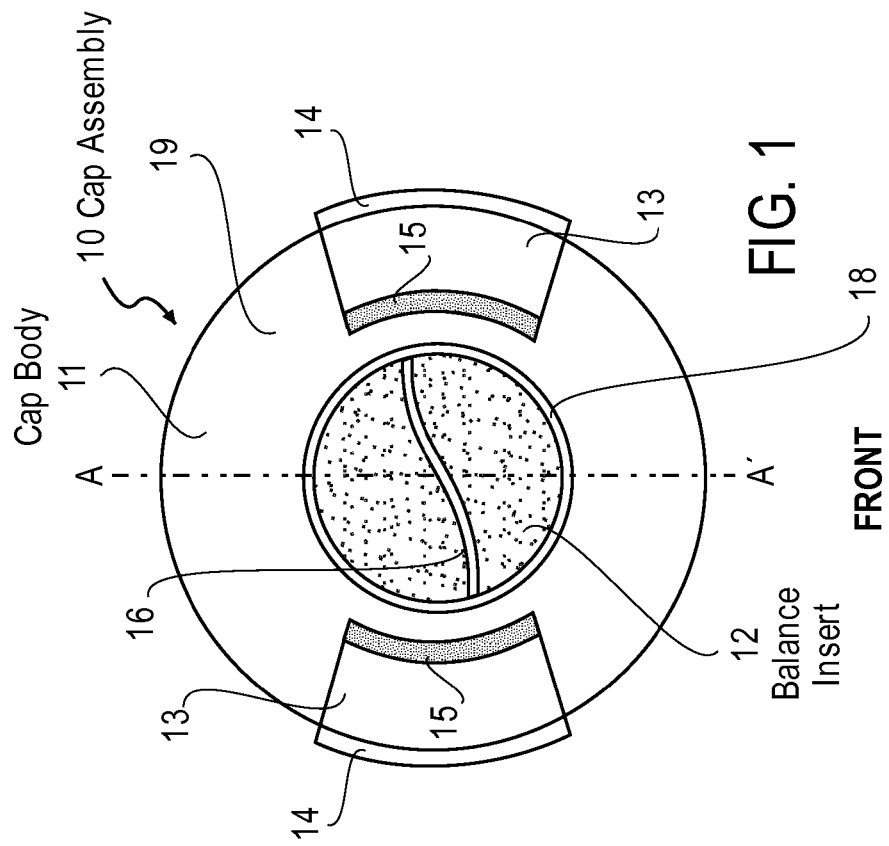
FIG. 1 illustrates a front view of a camera cap having a white balance insert according to an embodiment of the invention.

FIG. 1 illustrates a front view of a camera cap assembly 10 according to an embodiment of the invention. Camera cap assembly 10 includes a camera cap body 11 and a balance insert 12. Camera cap body 11 has a cut-out region correlating to the area covered by the in-camera spot meter. The cut-out region is defined by a ring-shaped area of 19, which is to be placed in front of a camera lens to partially cover the camera lens. Ring-shaped area 19 is typically opaque. Camera cap body 11 also includes a locking or attaching mechanism for engaging camera cap body 11 with the camera lens housing (not shown). For example, the locking or attaching mechanism may include, but is not limited to, a pressure locking mechanism (e.g., a side pinch mechanism or a center release mechanism), a flexible attachment lip, a threaded mechanism, or other secure mechanisms. The mechanism may be determined based on the type of camera lens and camera lens accessories that will be used. For example, a center release mechanism with inner pinch tabs, as shown in FIG. 1, may be more suitable when a camera hood is placed in front of the camera lens. With the placement of the camera hood, it becomes very difficult to remove or attach a lens cap (such as a side pinch lens cap or a threaded lens cap) securely from the side, because there is minimal space between the lens hood and the edge of the lens cap to release the locking mechanism. A center release mechanism with inner pinch tabs can resolve the problem caused by the use of the camera hood. A central release mechanism also precludes the accidental removal of a lens cap while it is being carried on the body or from bumping around in a camera bag.

As another example, a flexible attachment lip may be more suitable for use with a non-threaded filter lens, e.g., a wide-angle camera lens. This is because in some instances, a wide angle lens may not have front threads or a front rim to engage a pressure locking mechanism or a threaded mechanism. Instead of locking onto the rim of the camera lens housing, a flexible attachment lip simply fits over the outer perimeter of the camera lens housing. In the flexible attachment lip embodiment, the inner diameter of the camera cap may be larger than the inner diameter of the wide angle lens filter. For example, a wide angle lens with an 82 mm inner filter diameter may use a camera cap with an 85 mm inner diameter. The flexible attachment lip is typically made of a soft polycarbonate material or other suitable materials to have enough flexibility or stretch for a secure fitting.

FIG. 1 shows the embodiment where camera cap body 11 includes a pressure locking mechanism that can be used as both an center release mechanism and as a side pinch mechanism. In FIG. 1, two locking tabs 13 are positioned on opposite sides of camera cap body 11. Locking tabs 13 including side pinch members 14 and inner pinch members 15. Side pinch members 14 protrude outwardly, and can be pressed by a user toward the center of camera cap body 11. When placing cap assembly 10 in front of the camera, side pinch members 14 function as pressure locks to lock onto the inner rim of the camera lens housing. Inner pinch members 15 have a raised profile relative to the locking tabs 13. A user may press the inner pinch members 15 to engage cap assembly 10 with or disengage cap assembly 10 from the camera.

It is understood, however, the embodiment of FIG. 1 is for illustration only and numerous variations may exist. Camera cap body 11 may have only one of the side pinch mechanism or the center release mechanism. The design of the side pinch mechanism and the center release mechanism may differ from what is shown in FIG. 1. For example, side pinch members 14 may not protrude outwardly but may be aligned with the perimeter of camera cap body 11. Instead of using side pinch members 14 as pressure locks, locking tabs 13 may include catch members at the back side to engage with the inner rim of the camera lens housing. It is understood that embodiments of the invention include variations of the side pinch and inner pinch designs.

Referring to FIG. 1, in the center of cap body 11 is a cut-out region covered by a balance insert 12. Balance insert 12 includes a translucent piece calibrated to a predetermined translucency and color tone (e.g., 18% gray). Balance insert 12 may be used for custom white balance setting. In some embodiments, a user may interchange balance insert 12 to choose a neutral or warming white balance effect. In alternative embodiments, balance insert 12 may be immovably attached to cap body 11 as an integral part of camera cap 10. In some embodiments, a grip 16 may be molded on balance insert 12 for a user to grip when mounting/removing balance insert 12. The size of grip 16 is designed to not interfere with the custom white balance function. The shape and position of grip 16 may vary from the embodiment as shown. Balance insert 12 may also includes a collar 18 at the outer rim.

Figure 2:
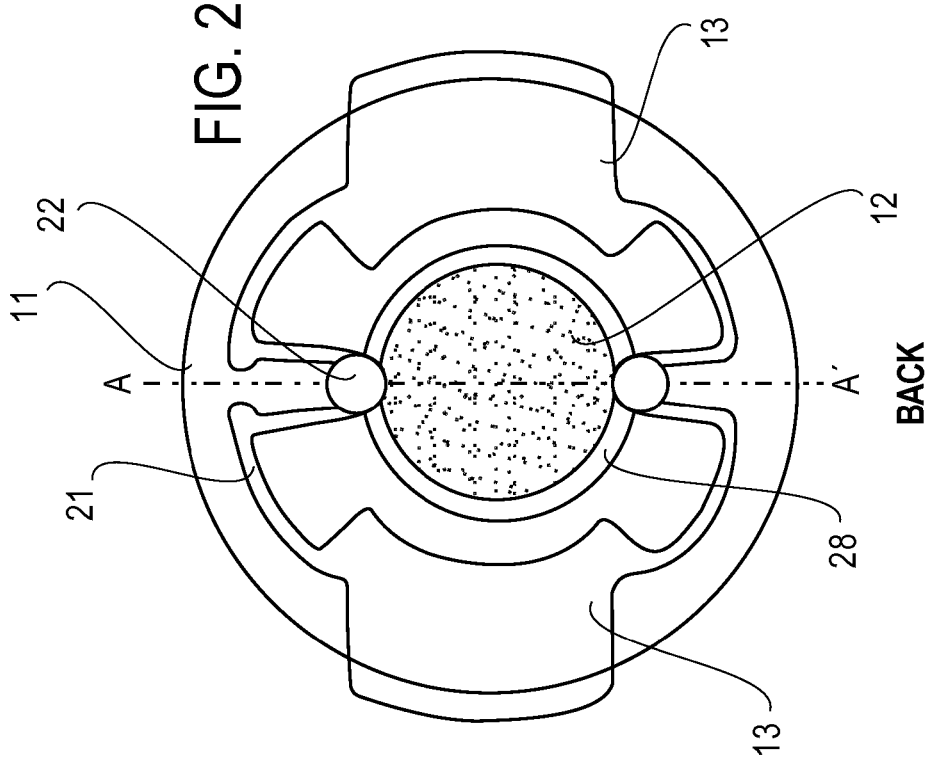
FIG. 2 illustrates a back view of the camera cap of FIG. 1.

FIG. 2 shows a back view of camera cap assembly 10 of FIG. 1. Camera cap assembly 10 including deformable elements 21 (e.g., plastic springs). Deformable elements 21 are temporarily deformed when locking tabs 13 are pressed inwardly in a radial direction and restored their original shape when locking tabs 13 are released. Deformable elements 21 may be reinforced by ball-shaped elements 22. FIG. 2 also shows a reinforcement lip 28 (e.g., reinforced plastic) that partially extends the back surface of cap body 11 into the center cut-out region. Reinforcement lip 28 functions as a stop element that stops balance insert from going through the center cut-out region of cap body 11. Reinforcement lip 28 prevents balance insert 12 from falling out from the back of camera cap assembly 10.

FIG. 3 shows a side profile of camera cap body 11 along a vertical dotted line A-A' of FIGS. 1 and 2. The side profile also shows a cut-out region 32 for receiving a removable and interchangeable balance insert, such as balance insert 12. In one embodiment, cut-out region 32 extends through cap body 11 and, therefore, accessible from both sides of camera cap 10. FIG. 3 also shows camera lens housing 31 (which is not part of cap assembly 10, but is part of the camera to which cap assembly attaches) and reinforcement lip 28 at the back side of cap body 11.

In an alternative embodiment, cut-out region 32 is accessible from only one side of cap body 11 (e.g., the front side of the camera). In this alternative embodiment, a clear transparent piece 35 (shown in FIG. 3 with dotted lines) covers one side (e.g., the back side) of cut-out region 32. Transparent piece 35 allows light to pass through without interfering with the function of balance insert 12. Thus, when balance insert 12 is removed from camera cap body 11, cap assembly 10 still completely covers the front side of the camera lens and serves the purpose of further protecting the lens from dust, moisture, and abrasion. A skilled person in the art will understand that numerous variations from what is shown may exist. For example, reinforcement lip 28 may be dispensed with when transparent piece 35 is used. Although not shown in FIG. 3, it is understood that the inner perimeter of cap body 11 is shaped to easily interlock with balance insert 12. As will be described in greater detail below, the inner perimeter of cap body 11 may include threads for threaded screw type balance insert, grooves for ball bearing type balance insert, magnets for magnetic type balance insert, or the like.

FIG. 4A and FIG. 4B shows another embodiment of camera cap assembly 40 as viewed from the front side and the back side, respectively. Camera cap assembly 40 includes a ring-shaped cap body 41 coupled to a flexible attachment lip 43, and balance insert 12 for custom white balancing. Flexible attachment lip 43 is typically made of a soft material, e.g., a polycarbonate material, to have enough flexibility or stretch for a secure fitting. FIG. 4B also shows a reinforcement lip 48, which is similar to reinforcement lip 28 of FIG. 2, positioned at an inner perimeter of cap body 41 to prevent balance insert from falling out from the back side. FIG. 4C shows the side view of camera cap assembly 40.

FIG. 5A and FIG. 5B shows the front view and the side view, respectively, of an embodiment of balance insert 12 in the form of a threaded balance insert 50 having threaded screw fitments 53. Threaded balance insert 50 may be used with cap body 11 or 41, or variations of them, to form camera cap assembly 10 or 40. Threaded balance insert 50 includes a center translucent piece 51 retained by a collar 52. Translucent piece 51 is translucent, typically 18% gray, but may have different color tones or different translucency for different photographic effects. Translucent piece 51 may be made of plastic, glass, or any suitable materials.

Threaded balance insert 50 is manually removable from camera cap body 11 or 41, and is interchangeable with balance inserts having different color tones, translucency, textures, etc. Threaded balance insert 50 may be locked onto cap body 11 or 41 by a screw-type interlocking mechanism. The screw-type interlocking mechanism may be implemented by threads on balance insert 50 and on corresponding inner perimeter of cap body 11 or 41. Balance insert 50 and inner perimeter of cap body 11 or 41 both have sufficient thickness to include sufficient threads for secure engagement of threaded balance insert 50. In some embodiments, threaded balance insert 50 may have a concaved front surface coupled to a molded grip 56 for a user to hold on when mounting or removing balance insert 50. Grip 56 may be placed across the diameter of threaded balance insert 50. Alternatively, grip 56 may be placed near the front center or near the perimeter of threaded balance insert 50. Grip 56 is designed such that its existence does not interfere with the white balancing function of threaded balance insert 50.

FIG. 6A shows another embodiment of balance insert 12 in the form of a ball-bearing type balance insert 60. Balance insert 60 is locked onto cap body 11 or 41, or variations of them, by a ball-bearing type interlocking mechanism. Balance insert 60 includes a center translucent piece 61 retained by a collar 62. Translucent piece 61 is translucent, typically 18% gray, but may have different color tones or different translucency for different photographic effects. Translucent piece 61 may be made of plastic, glass, or any suitable materials.

In this embodiment, collar 62 includes a plurality of ball bearing elements 63, each of which may be locked into a corresponding groove (not shown) on the inner perimeter of cap body 11 or 41. In some embodiments, ball bearing elements 63 and the corresponding grooves may be magnetized or may include magnets to more securely bind balance insert 60 to cap body 11 or 41.

FIG. 6B show a side profile ball bearing elements 63. Each ball bearing element 63 is positioned in a slot defined by a retainer ring 64 that extends into collar 62. Retainer ring 64 is frictionally fit into collar 62 of balance insert 60. Ball bearing element 63 is attached to the bottom of the slot by a spring 65, which allows ball bearing locking elements 63 to retract into the slot when pressed against cap body 11 or 41 and locked into the corresponding grooves on the inner perimeter of cap body 11 or 41.

Thus, a camera cap assembly with a white balance insert has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
    a camera cap body, which is attached to a camera lens housing of a camera when measuring white balance of a scene and when the camera is not in use, the camera cap body comprising:
        a locking mechanism to engage with the camera lens housing; and
        a ring-shaped area that partially covers a front side of a camera lens of the camera when attached to the camera lens housing, wherein an inner periphery of the ring-shape area defines a cut-out area located at a center of the camera cap body; and
    a translucent piece, which is inserted into the cut-out area when measuring white balance of the scene and when the camera is not in use, the translucent piece being exposed on both front and back sides of the camera cap body when inserted into the cut-out area, the translucent piece being manually removable from the camera cap body and interchangeable with another translucent piece of a different color tone,
    wherein the translucent piece has a size that fits into the cut-out area and is correlated with an area covered by an in-camera spot meter of the camera.

2. The apparatus of claim 1 wherein the locking mechanism includes pressure locks coupled to deformable members to engage with the camera lens housing.

3. The apparatus of claim 2 wherein the locking mechanism include a side pinch mechanism.

4. The apparatus of claim 2 wherein the locking mechanism includes a center release mechanism.

5. The apparatus of claim 1 wherein the translucent piece includes an interlocking mechanism located on an outer perimeter of the translucent piece to engage with an inner perimeter of the ring-shaped area on the camera cap body.

6. The apparatus of claim 1 wherein the translucent piece includes threads on an outer perimeter of the translucent piece to engage with corresponding threads on an inner perimeter of the ring-shaped area on the camera cap body.

7. The apparatus of claim 6 wherein the translucent piece includes a concaved front surface with a molded grip.

8. The apparatus of claim 1 wherein the translucent piece includes a plurality of ball bearing elements on an outer perimeter to lock into corresponding grooves on an inner perimeter of the ring-shaped area on the camera cap body.

9. The apparatus of claim 1 wherein the translucent piece includes a plurality of magnetic elements to magnetically engage the translucent piece to the camera cap body.

10. The apparatus of claim 1 wherein the translucent piece is one of a plurality of interchangeable translucent pieces, each to be used for a different effect.

11. The apparatus of claim 1 wherein the translucent piece has a gray color tone.

12. An apparatus comprising:
    a camera cap body, which is attached to a camera lens housing of a camera when measuring white balance of a scene and when the camera is not in use, the camera cap body comprising:
        a flexible member at an outer perimeter of the camera cap body to be fitted over an outer perimeter of the camera lens housing; and
        a ring-shaped area that partially covers a front side of a camera lens of the camera when attached to the camera lens housing, wherein an inner periphery of the ring-shape area defines a cut-out area located at a center of the camera cap body; and
    a translucent piece, which is inserted into the cut-out area when measuring white balance of the scene and when the camera is not in use, the translucent piece being exposed on both front and back sides of the camera cap body when inserted into the cut-out area, the translucent piece being manually removable from the camera cap body and interchangeable with another translucent piece of a different color tone, wherein the translucent piece has a size that fits into the cut-out area and is correlated with an area covered by an in-camera spot meter of the camera.

13. The apparatus of claim 12 wherein the translucent piece includes threads on an outer perimeter of the translucent piece to engage with corresponding threads on an inner perimeter of the ring-shaped area on the camera cap body.

14. The apparatus of claim 13 wherein the translucent piece includes a concaved front surface with a molded grip.

15. The apparatus of claim 12 wherein the translucent piece includes an interlocking mechanism positioned at an outer perimeter of the translucent piece to engage with the ring-shaped area on the camera cap body.

16. The apparatus of claim 12 wherein the translucent piece is one of a plurality of interchangeable translucent pieces, each to be used for a different effect.

17. The apparatus of claim 12 wherein the translucent piece has a gray color tone.

18. An apparatus comprising:
   a camera cap body, which is attached to a camera lens housing of a camera when measuring white balance of a scene and when the camera is not in use, the camera cap body comprising:
      a ring-shaped area that partially covers a front side a camera lens of the camera when attached to the camera lens housing, wherein an inner periphery of a front surface of the ring-shape area defines a cut-out area located at a center of the camera cap body; and
      a locking mechanism to engage the camera cap body with a camera lens housing, the locking mechanism comprising a reinforcement lip, a deformable element and locking tabs, the reinforcement lip and the deformable element located at a back surface of the ring-shaped area, the deformable element coupled to the locking tabs and the reinforcement lip, the deformable element to be temporarily deformed when the locking tabs are pressed inwardly in a radial direction and restored to an original shape when the locking tabs are released, the reinforcement lip defining an inner periphery of the back surface of the ring-shaped area and partially extending the back surface into the cut-out area to serve as a stop element for an insert of the camera cap body; and
   a translucent piece, which serves as the insert of the camera cap body when measuring white balance of the scene and when the camera is not in use, the translucent piece exposed on both front and back sides of the camera cap body when inserted into the cut-out area, the translucent piece being manually removable from the camera cap body and interchangeable with another translucent piece of a different color tone,
   wherein the ring-shape area has a radius that accommodates placement of the locking mechanism at a back surface of the ring-shape area, the back surface of the ring-shape area being oriented toward the camera lens when the camera cap body is attached to the camera lens housing, and the locking mechanism spans across the entire radius of the back surface of the ring-shape area, and,
   wherein the translucent piece has a size that fits into the cut-out area and is correlated with an area covered by an in-camera spot meter of the camera.

19. The apparatus of claim 18 wherein the locking mechanism includes pressure locks coupled to the deformable element to engage with the camera lens housing.

20. The apparatus of claim 18 wherein the translucent piece includes an interlocking mechanism located on an outer perimeter of the translucent piece to engage with an inner perimeter of the ring-shaped area.

* * * * *